United States Patent [19]

Basler

[11] Patent Number: 5,401,969
[45] Date of Patent: Mar. 28, 1995

[54] SCINTILLATION CAMERA

[75] Inventor: Steven F. Basler, Maryville, Tenn.

[73] Assignee: Scintillation Technologies Corporation, Maryville, Tenn.

[21] Appl. No.: 95,397

[22] Filed: Jul. 21, 1993

[51] Int. Cl.$^6$ .............................................. G01T 1/28
[52] U.S. Cl. ................... 250/363.10; 250/368; 313/540
[58] Field of Search .......... 250/363.1, 368; 313/540, 525–536, 105 CM, 103 CM

[56] References Cited

U.S. PATENT DOCUMENTS

| | | | |
|---|---|---|---|
| 3,777,142 | 12/1973 | Grenier et al. | 250/580 |
| 4,048,501 | 9/1977 | Grenier | 250/367 |
| 4,079,257 | 3/1978 | Jatteau et al. | 250/363.07 |
| 4,179,100 | 12/1979 | Sashin et al. | 250/370.09 |
| 4,267,452 | 5/1981 | Govaert | 250/366 |
| 4,288,695 | 9/1981 | Walters et al. | 378/5 |
| 4,403,149 | 9/1983 | Govaert | 250/369 |
| 4,434,369 | 2/1984 | Metal | 250/363.02 |
| 4,437,160 | 3/1984 | Blum | 364/413.23 |
| 4,497,024 | 1/1985 | Roth | 364/413.23 |
| 4,632,123 | 12/1986 | Govaert et al. | 128/659 |
| 4,647,779 | 3/1987 | Wong | 250/363.03 |
| 4,675,526 | 6/1987 | Rogers et al. | 250/363.02 |
| 4,694,398 | 9/1987 | Croteau | 364/413.24 |
| 4,778,997 | 10/1988 | Döring | 250/363.1 |
| 4,831,261 | 5/1989 | Genna et al. | 250/363.01 |
| 4,831,262 | 5/1989 | Govaert et al. | 250/363.01 |
| 4,839,808 | 6/1989 | Koral et al. | 364/413.24 |
| 4,956,796 | 9/1990 | Rogers et al. | 364/581 |
| 5,103,823 | 4/1992 | Acharya et al. | 128/653.1 |
| 5,118,948 | 6/1992 | Ito et al. | 250/369 |

FOREIGN PATENT DOCUMENTS 61-68580 4/1986 Japan ................... 250/368

OTHER PUBLICATIONS

J. Gethyn Timothy, George H. Mount, and Richard L. Bybee, "Multi-anode microchannel arrays." *Proceedings SPIE LASL Optics Conference*, vol. 190 (1979) pp. 360–368.

M. Watanabe et al.; A High Resolution Pet for Animal Studies, IEEE Transactions on Medical Imaging; vol. 11, No. 4, 1992; pp. 577–580.

H. Kume et al.; Photomultiplier Tubes for BaF2/BGO Crystal Scintillators; IEEE Transaction on Nuclear Science; vol. 33, No. 1, 1986; pp. 364–369.

H. Kume et al.; Position Sensitive Photomultiplier Tubes for Scintillation Imaging; IEEE Transaction on Nuclear Science, vol. 33, No. 1, 1986; pp. 359–363.

T. Hayashi; New Photomultiplier Tubes for Medical Imaging; IEEE Transactions on Nuclear Science; vol. 36, No. 1, 1989; pp. 1078–1083.

*Primary Examiner*—Constantine Hannaher
*Attorney, Agent, or Firm*—Luedeka, Neely & Graham

[57] ABSTRACT

A scintillation camera to image subjects using high energy photons (HEP's), having a HEP collimator for passing only some of the HEP's received from the subject, a HEP detector made of a scintillating material which produces visible light photons (VLP's) when it absorbs HEP's, a VLP collimator for passing only some of the VLP's received from the HEP detector, a VLP detector employing photomultiplier tubes (PMT's) having an array of anodes disposed within anode regions that are wired such that only some of the anodes in a given column are wired to the column lead, and only some of the anodes in a given row are wired to a row lead, with the row leads and column leads of the different anode regions being individually addressable, and also employing processing circuitry to receive the electrical signals from the VLP detector and convert them to electronic representations of the subject, which are then converted into an image by a display.

17 Claims, 7 Drawing Sheets

SCINTILLATION CAMERA

FIELD OF THE INVENTION

This invention relates to imaging of a subject using high energy photons (HEP's), such as gamma photons or x-rays, and a scintillation camera, and more specifically to a scintillation camera employing a HEP collimator, a Bismuth Germanate (BGO) scintillatot crystal HEP detector, a visible light photon (VLP) collimator, a photomultiplier tube (PMT) VLP detector, processing circuitry, and a display.

BACKGROUND

Scintillation cameras are used in many fields of study. In the medical field they are used to obtain images of internal organs in-situ and in real-time. For a gamma type scintillation camera, the subject is injected with one of a number of radioactive isotopes common to one skilled in the art. The specific isotope used is selected according to its different physical properties, including how much radiation it will emit. For an x-ray type scintillation camera, the x-rays are radiated from a source located outside of the body of the subject, with the subject positioned between the x-ray source and the scintillation camera.

The scintillation camera creates an image of the subject by detecting the HEP's emitted. The detector may incorporate a scintillating material that produces VLP's when a HEP is absorbed.

It is beneficial to maximize imaging rate, spatial resolution, and ease of manufacture, and to minimize noise and cost of manufacture. Unfortunately, in traditional scintillation camera designs, these goals compete against each other. Those designs which increase imaging rate, for example, tend to decrease spatial resolution, and those designs which increase spatial resolution tend to decrease imaging rate.

One complication to achieving the goal of a high imaging rate is the fact that only a single scintillation event can be recorded within a single scintillation crystal during a single data collection interval. This is because the VLP's generated by the scintillation event propagate throughout the scintillation crystal such that information relating to a single HEP strike, and that relating to multiple HEP strikes, would be confounded. Since HEP's impinge within the scintillator crystal at an asynchronous rate that increases proportionally with an increase in the strength of the radiation source presenting the HEP's, the data collection interval must be extremely short so as not to include more than one strike.

As the data collection interval is decreased to reduce the probability of multiple strikes within the interval, the rate at which the processing circuitry must handle the data increases. A point is reached at which the processing circuitry becomes the rate determining step, and no further decrease in data collection interval is possible because the processing circuitry is not able to keep up with the amount of data received from the VLP detector, or the speed at which the data is being sent, and the scintillation camera will thus be too slow for applications where a higher rate is required.

Another problem with the traditional scintillation camera designs is the high level of spurious noise received from the PMT's in the VLP detector. PMT's in a traditional design are subject to dark current pulse. This means that sometimes, even when there is no VLP input at the photocathodes to trigger an electron shower and resultant electrical signal, a current pulse will be generated and sent out from the PMT. This dark current pulse results in a low signal to noise ratio, and further decreases the number of detectable scintillation events.

There is a need, therefore, for a scintillation camera that has a fast imaging rate, fine spatial resolution, and a high signal to noise ratio, yet is easy and inexpensive to manufacture.

SUMMARY

This invention is a scintillation camera that is easier to manufacture than prior designs, and thus costs less to make, yet has the fast imaging rate, fine spatial resolution, and high signal to noise ratio desired.

The invention comprises a camera that has a HEP detector. The HEP detector converts the HEP's into VLP's. In a preferred embodiment, the HEP detector is made from a scintillating material, which in alternate embodiments could be made of crystals of NaI(Tl) or BGO. In a preferred embodiment, the HEP detector is made of a plurality of scintillator crystals.

A VLP detector is also provided. The VLP detector converts the VLP's into electrical signals by using a PMT. The PMT has a photocathode that emits electrons when struck by a VLP. These electrons strike multiple layers of dynodes, which emit more electrons. The electrons finally strike upon anode arrays that are disposed within at least one anode region.

In a preferred embodiment, the electrical signals produced by the electrons striking the anode arrays are conducted along the row and column leads of the anode arrays to the processing circuitry, and the row and column leads of one anode region are addressable independently of the row and column leads of all other anode regions. A multiplexer is used so that all the electrical signals from the independently addressable row and column leads from the different anode regions within the VLP detector can be simultaneously converted into an electronic representation of the subject.

The processing circuitry converts the electrical signals into an electronic representation of the subject. Preferably, the processing circuitry includes a look-up table, which contains all the valid combinations of electrical signals that can be received from the VLP detector. All the electrical signals received from the VLP detector are compared to the combinations contained in the look-up table. Combinations of electrical signals that are valid are used to assemble an electronic representation of the subject. The electronic representation is then finally converted into an image by a display.

In a preferred embodiment, a HEP collimator is positioned between the subject and the HEP detector. The HEP collimator is used so that only some of the HEP's received from the subject are passed. The HEP's that are received along directional vectors which do not deviate more than a predetermined value from a predetermined direction will pass the HEP collimator, and all other HEP's will not. The HEP collimator is preferably made of a sheet of material that is impervious to HEP's. Within the sheet are a plurality of vias. All the vias are parallel to each other, and lead from a first surface of the sheet to a second surface of the sheet that is both parallel and opposite to the first surface. In this embodiment, a VLP collimator is disposed between the HEP detector and the VLP detector. The VLP collimator is used so that only some of the VLP's received from the HEP detector are passed. The VLP's that are received along directional vectors which do not deviate more than a predetermined value from a predetermined direction will pass the VLP collimator, and all other VLP's will not.

The VLP collimator is made of light pipes having a square cross section. The first end of each light pipe is adjacent the HEP detector and is treated to a predetermined length. In one embodiment the treatment is an opaque material that is applied to the outer surface of each light pipe. In a preferred embodiment the light pipes are at least 4 inches in length and allow the VLP's to reach a plurality of PMT's whose photocathodes would otherwise be offset from the HEP detector due to the properties of PMT manufacture.

BRIEF DESCRIPTION OF THE DRAWINGS

These and other features, aspects, and advantages of the present invention will become better understood when considered in conjunction with the following description of preferred embodiments, appended claims, and accompanying drawings, where:

DESCRIPTION

Figure 1:
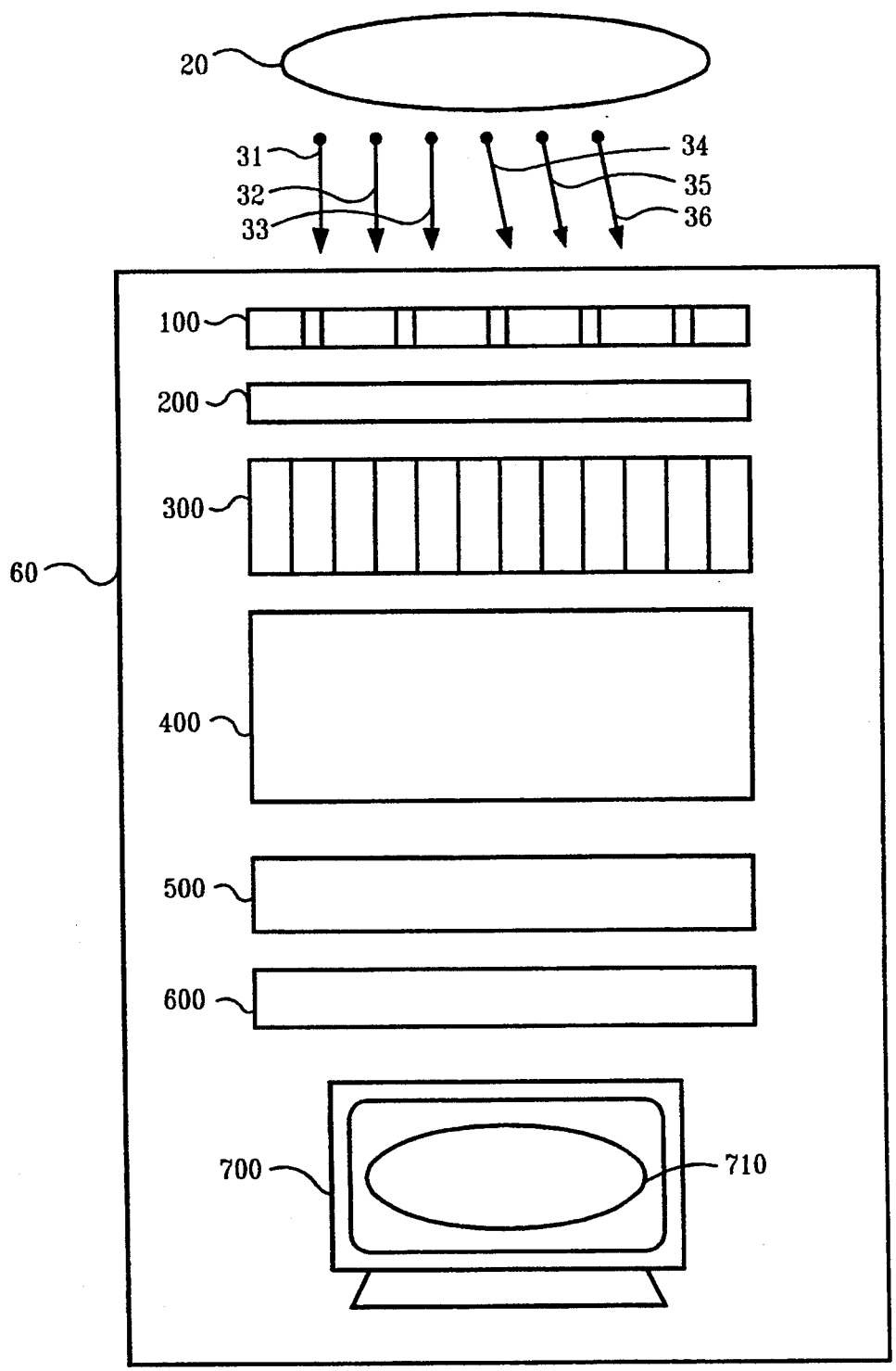
FIG. 1 shows an exploded view of a typical HEP scintillation camera.

Referring first to FIG. 1, a subject 20 is irradiated by HEP's 31-36, which pass through the tissue of the subject 20 to a scintillation camera 60. In this preferred embodiment, the scintillation camera 60 is comprised of a HEP collimator 100, a HEP detector 200, a VLP collimator 300, a VLP detector 400, which is a PMT, a multiplexer 500, a processing circuitry 600, and a display 700.

Figure 2:
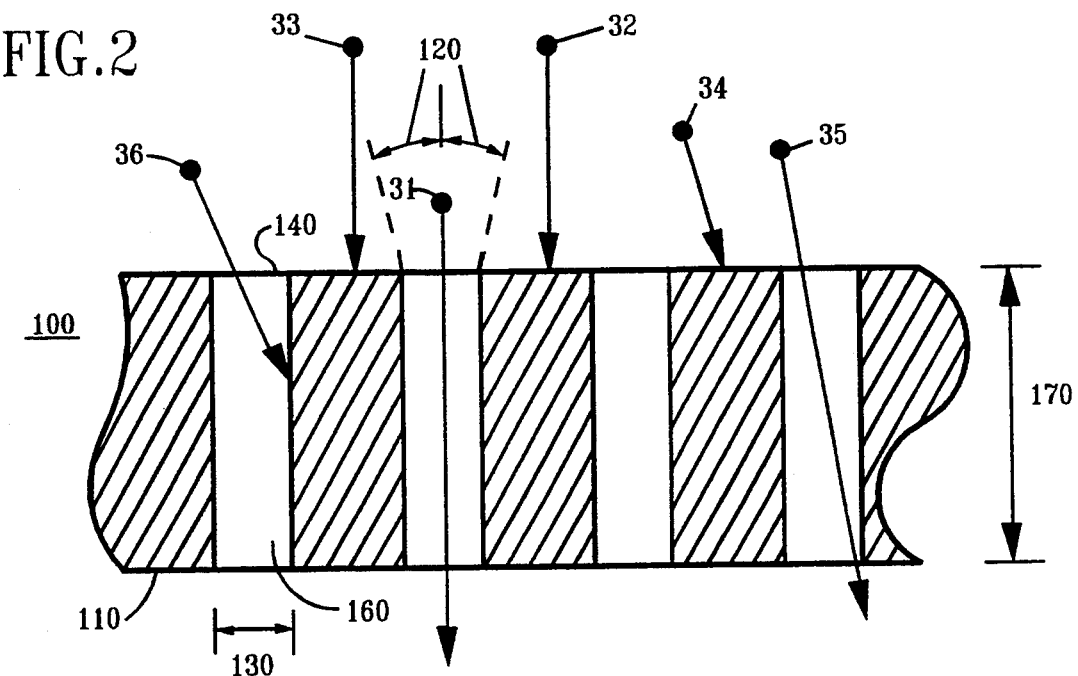
FIG. 2 shows a cross-sectional view of the HEP collimator of FIG. 1.

Referring now to FIG. 2, the HEP's 31-36 are received at the HEP collimator 100 of the scintillation camera 60. The HEP collimator 100 is designed to collimate the HEP's 31-36 received so as to reduce the detection of scattered HEP's 34-36. The HEP collimator 100 is employed so that the spatial resolution, or x-y location information is not lost as the HEP's 31-36 arrive at the scintillation camera 60. Without screening out the HEP's 34 and 36 that are radiated along directional vectors deviating by more than a predetermined value (such as 6 degrees, for example) from a predetermined direction (normal to the collimator), the image 710 produced by the scintillation camera 60 would not be an accurate representation of the subject 20, unless another correction means is employed at a later stage in the processing of the information.

The HEP collimator 100 is made of a sheet of material 110 (such as lead) through which the HEP's 31-36 cannot penetrate, in which a plurality of parallel vias 160 have been formed. HEP's 31 and 35 entering the vias 160 along directional vectors within an angle 120 approximately normal to the plane of the via openings 140 will be able to pass through the HEP collimator 100 into the other parts of the scintillation camera 60, while those HEP's 32-34 which impinge on the sheet 110 itself, or those HEP's 36 which enter a via 160 along directional vectors at an angle which deviates too far from normal to the plane of the via openings 140, will be shielded by the sheet 110 from further penetration into the scintillation camera 60. The degree of departure 120 from normal at which a HEP 31, 35, and 36 entering a via 160 will be able to pass through the via 160 is a function of the via diameter 130 and sheet thickness 170. The percentage of the HEP's 31-36 able to pass through the HEP collimator 100 is a function of the number of vias 160, via diameter 130, and sheet thickness 170. Reducing the spacing between the vias 160 allows more of the HEP's 31-36 to successfuly pass through a via 160 and enter the scintillation camera 60. An example of an appropriate collimator 100 is a sheet 110 of lead having 16 vias 160 per square centimeter, having a via diameter 130 of 2 millimeters, and having a sheet thickness 170 of 20 millimeters.

Figure 3:
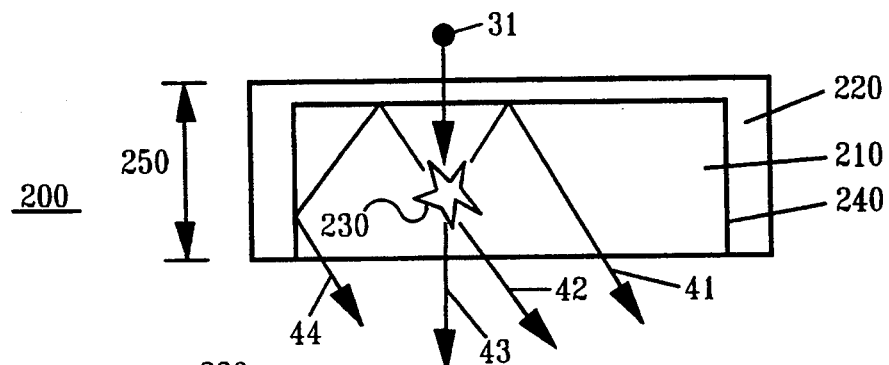
FIG. 3 shows a cross-sectional view of a scintillator crystal.

The HEP's 31 and 35 which have successfully passed through the vias 160 in the HEP collimator 100 next impinge on a HEP detector 200, depicted in FIG. 3, which in a preferred embodiment is made of a scintillator material 210. The scintillator material 210 absorbs the HEP's 31, producing VLP's 41-44. The greater the energy possessed by a HEP 31, the deeper into the scintillator material 210 it will penetrate before being absorbed and causing a scintillation event 230. The scintillator material 210 used will be of a thickness 250 sufficient to stop HEP's 31 of a predetermined energy level. For example, the material 210 may have a thickness of about 5 millimeters for stopping HEP's having an energy level of about 200 KEV. In a preferred embodiment, scintillator material 210 may be made of NaI(Tl), or BGO.

The HEP detector 200 may be of a single large crystal of scintillator material 210, or in a preferred embodiment, of a plurality of smaller crystals of scintillator material 210 arranged to cover approximately the same surface area as a single larger crystal, so that information from HEP 31 strikes in the several scintillation crystals 210 can be multiplexed and processed in parallel, thus increasing the imaging rate of the scintillation camera 60 proportionally with the number of different scintillation crystals 210 so employed.

The VLP's 41-44 generated at a scintillation site 230 by an absorption of the HEP 31 will radiate in several directions. To increase the detectable signal strength from a scintillation event 230, the scintillator crystal 210 may have a reflective coating 220 on as many as all but one of its faces 240. The reflective coating 220 is made of a material (such as Barium Sulfate BaSO$_4$) that is reflective to VLP's 41-44, but transparent to HEP's 31. This reflective coating 220 allows all HEP's 31 to enter the scintillation crystal 210, and directs, as much as possible, all VLP's 41-44 further into the scintillation camera 60.

Figure 4:
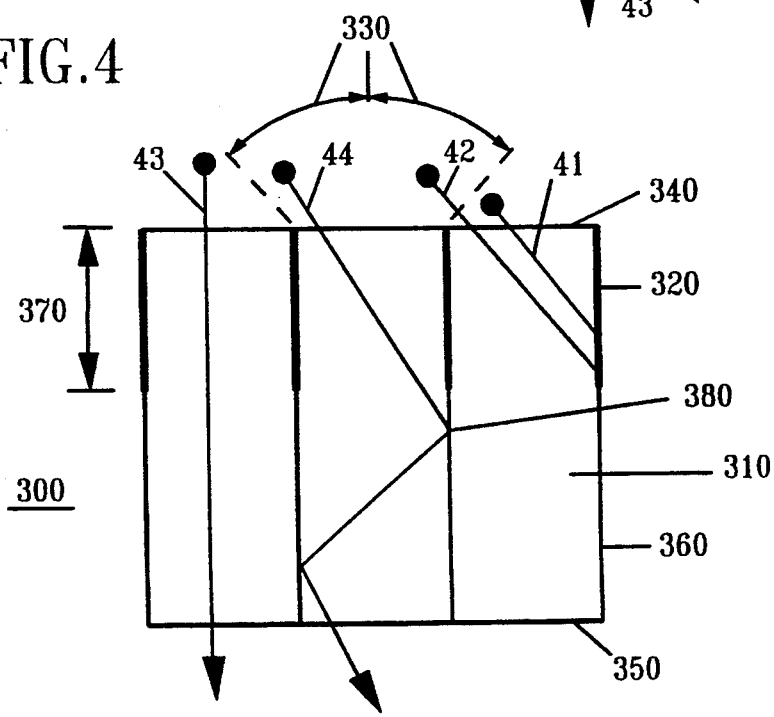
FIG. 4 shows a cross-sectional view of the VLP collimator of FIG. 1.

The VLP's 41-44 exiting the HEP detector 200 next pass through a VLP collimator 300 as shown in FIG. 4. This, as well as the HEP collimator 100, is a device employed to preserve the spatial resolution of the information received by the scintillation camera 60, so that the image it creates is an accurate representation of the subject 20. Again, if either or both of the HEP collimator 100 or VLP collimator 300 are excluded from the design, some sort of correction must be made at a later point by the processing circuitry.

In the preferred embodiment, the VLP collimator 300 will be made of at least one light pipe 310 constructed of a clear material such as that sold under the trademark "Plexiglass," or glass. VLP's 41-44 which enter a first end 340 of the light pipe 310 along a directional vector within an acceptance angle 330 approximately normal to the plane of the first end 340 of the light pipe 310 will be propagated along the light pipe 310 and exit a second end 350. How close to normal the angle 330 must be is determined by the refractive characteristics of the material used to make the light pipe 310, and any treatment which the light pipe 310 may have received. The light pipe 310 preferably has an acceptance angle of about 40 degrees.

In the preferred embodiment, an appropriate opaque substance 320 (such as black anodized aluminum) is applied to a surface 360 near the first end 340 of the light pipe 310. A VLP 43 and 44 must enter the first end 340 at an angle such that its first reflection 380 off the surface 360 of the light pipe 310, if indeed it strikes the surface 360 of the light pipe 310 at all, occurs at a point on the surface 360 that is not so treated, or it will not be reflected and propagated, but absorbed. The greater the distance 370 (Preferably about 6 millimeters) along the light pipe 310 from the end 340 that the surface 360 is treated, the closer to normal the directional vector of the entering VLP 41-44 must be in order for it to be propagated.

Figure 5:
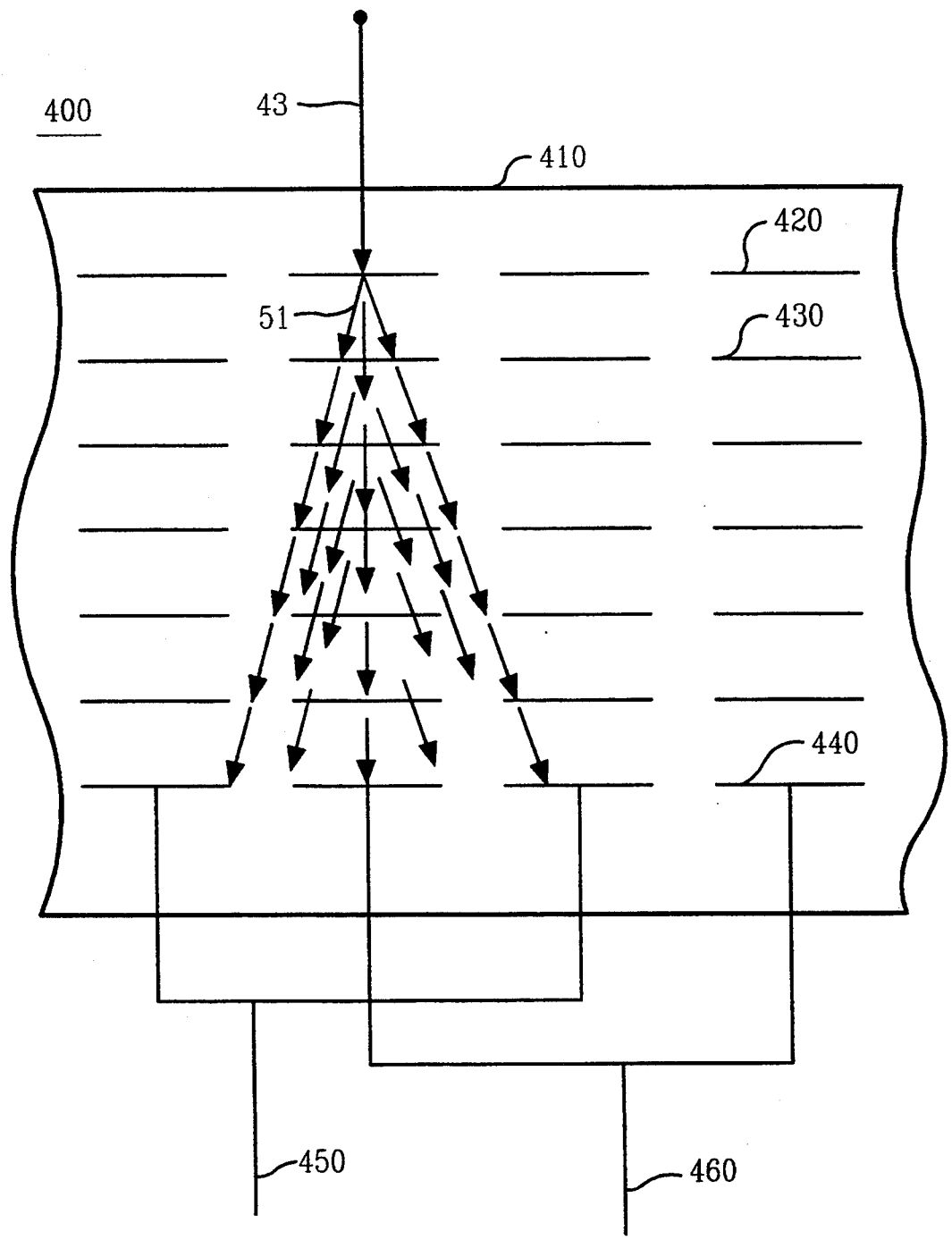
FIG. 5 shows a cross-sectional view of a PMT.

Those VLP's 43 and 44 that are successful in propagating through the VLP collimator 300 are next received by a VLP detector 400 as depicted in FIG. 5. In the preferred embodiment, the VLP detector 400 is comprised of at least one PMT 410. The VLP's 43 which enter the PMT 410 impinge on a photocathode 420, are absorbed, and create a shower of electrons 51 which exit the photocathode 420 along directional vectors determined by that of the entering VLP 43. This shower of electrons 51 cascades through a series of dynodes 430, with each electron 51 continuing the cycle of impinging, absorption, and creation of a new shower of electrons 51. As this continues through a plurality of dynode 430 layers, the total number of electrons 51 in the shower increases, until a signal strong enough to be electrically detected is received at an anode 440 at the end of the cascading dynode 430 levels.

Figure 6:
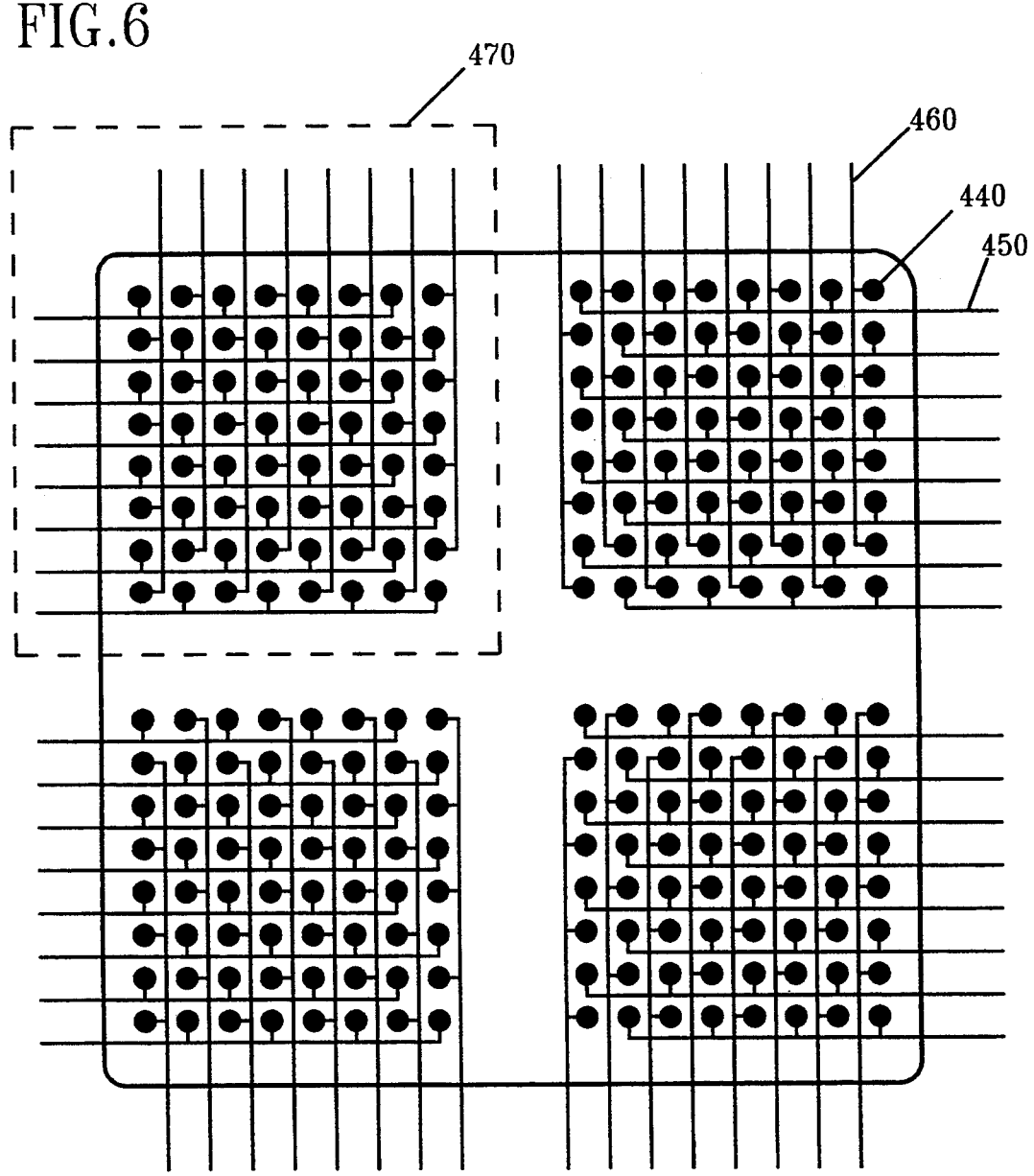
FIG. 6 shows an anode region configuration within a single PMT.
Figure 7:
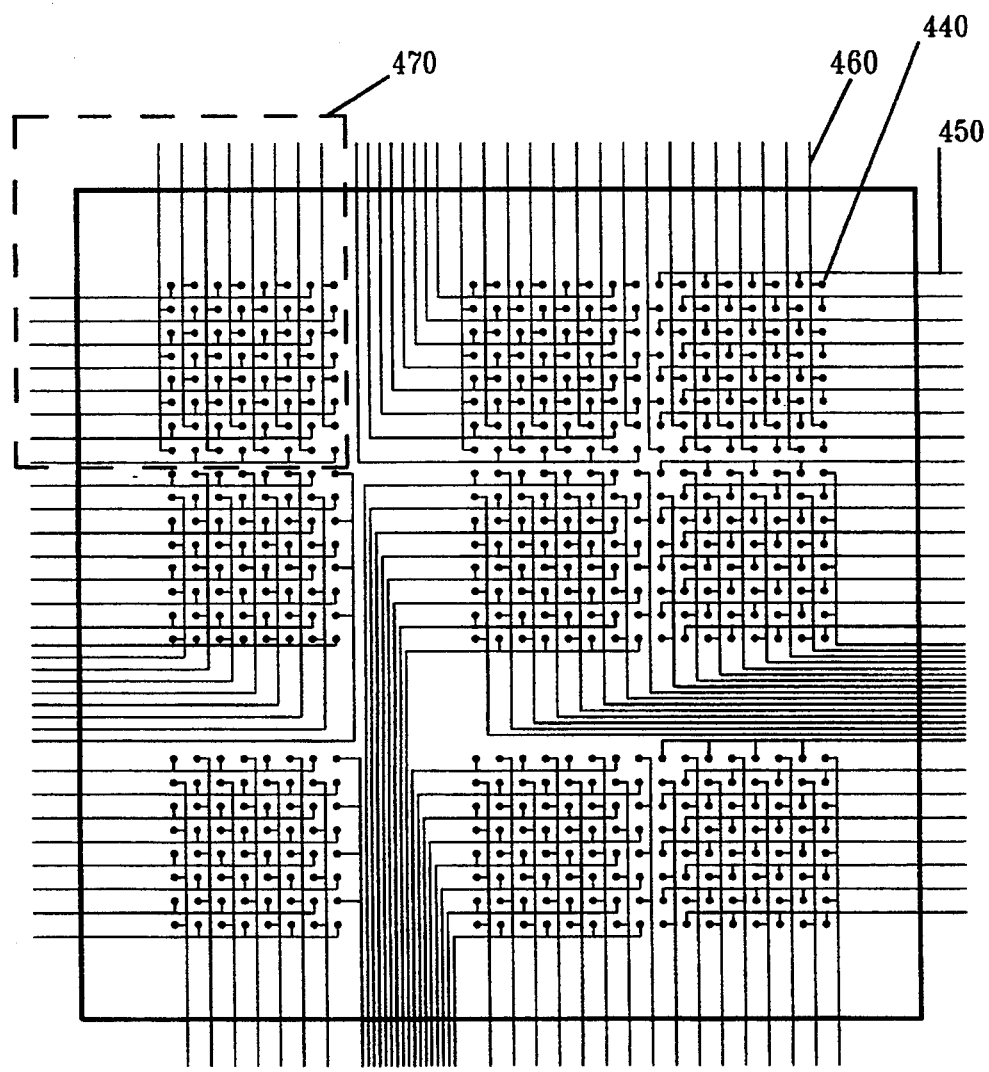
FIG. 7 shows an alternate anode region configuration within a single PMT.

Referring now to FIG. 6, the anodes 440 are disposed within separate anode regions 470. Each anode 440 is connected to either a row lead 450 or a column lead 460, but not to both a row lead 450 and a column lead 460. This unique wiring configuration reduces the total number of connections to the anodes 440, and reduces manufacturing complexity and cost. The row leads 450 and the column leads 460 from each anode region 470 are addressable independently from the row leads 450 and column leads 460 of all other anode regions 470. FIG. 7 shows an alternate embodiment of the anode regions 470.

Figure 8:
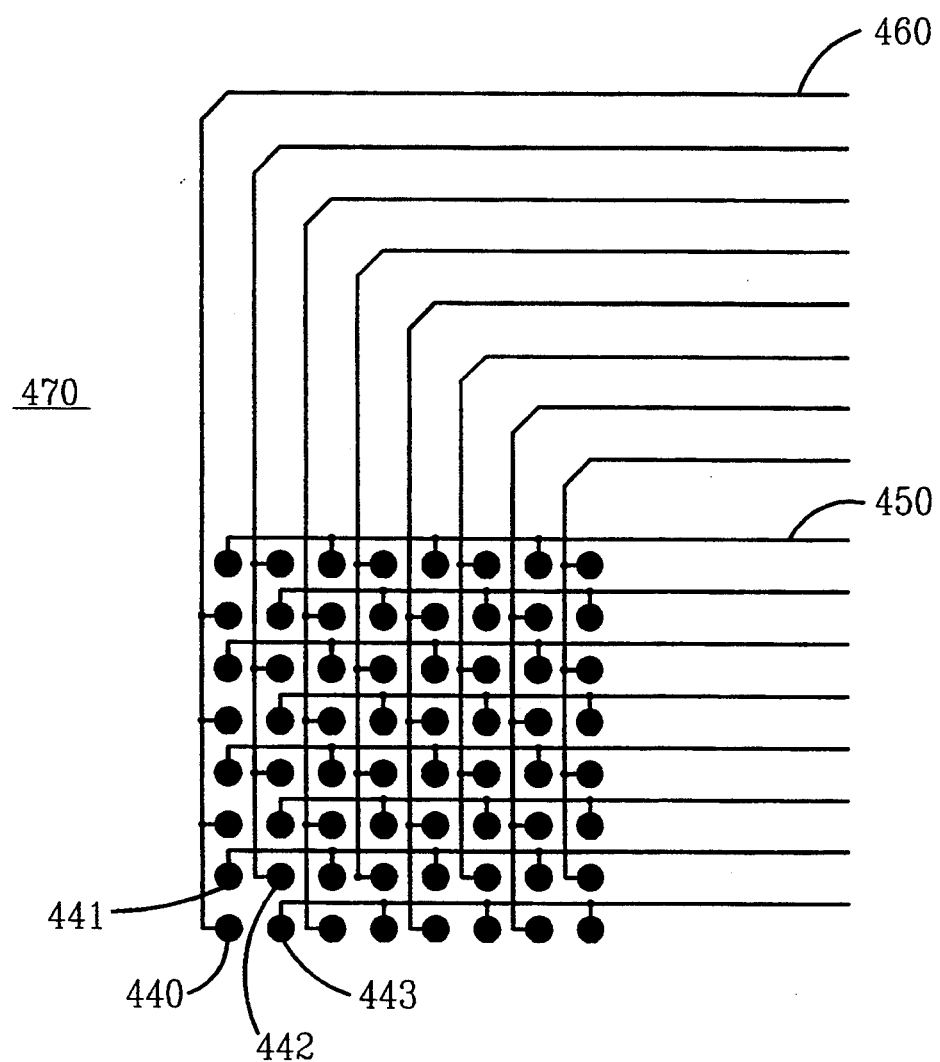
FIG. 8 shows an interleaved row and column wiring within the anode array of a single anode region.

FIG. 8 refers to a preferred embodiment of the wiring of the anodes 440 within a single anode region 470. Each anode region 470 contains 64 anodes 440 arranged into an 8×8 matrix as shown. For each matrix there are 8 row leads 450 and 8 column leads 460. Each one of the row leads 450 represents 1 bit in a most significant byte, and each column lead represents 1 bit in a least significant byte. The two bytes are joined to form a single 16 bit word. Any anode 440 may be connected to any row lead 450 or column lead 460 according to the following rules:

A) Four anodes 440 must be connected to each row lead 450 and each column lead 460.

B) An anode 440 may not be connected to the same bit, or a bit in the same byte as an adjacent anode 443 in the same row.

C) An anode 440 may not be connected to the same bit or a bit in the same byte as an adjacent anode 441 in the same column.

D) An anode 440 may not be connected to the same bit as a diagonally adjacent anode 442.

Figure 9:
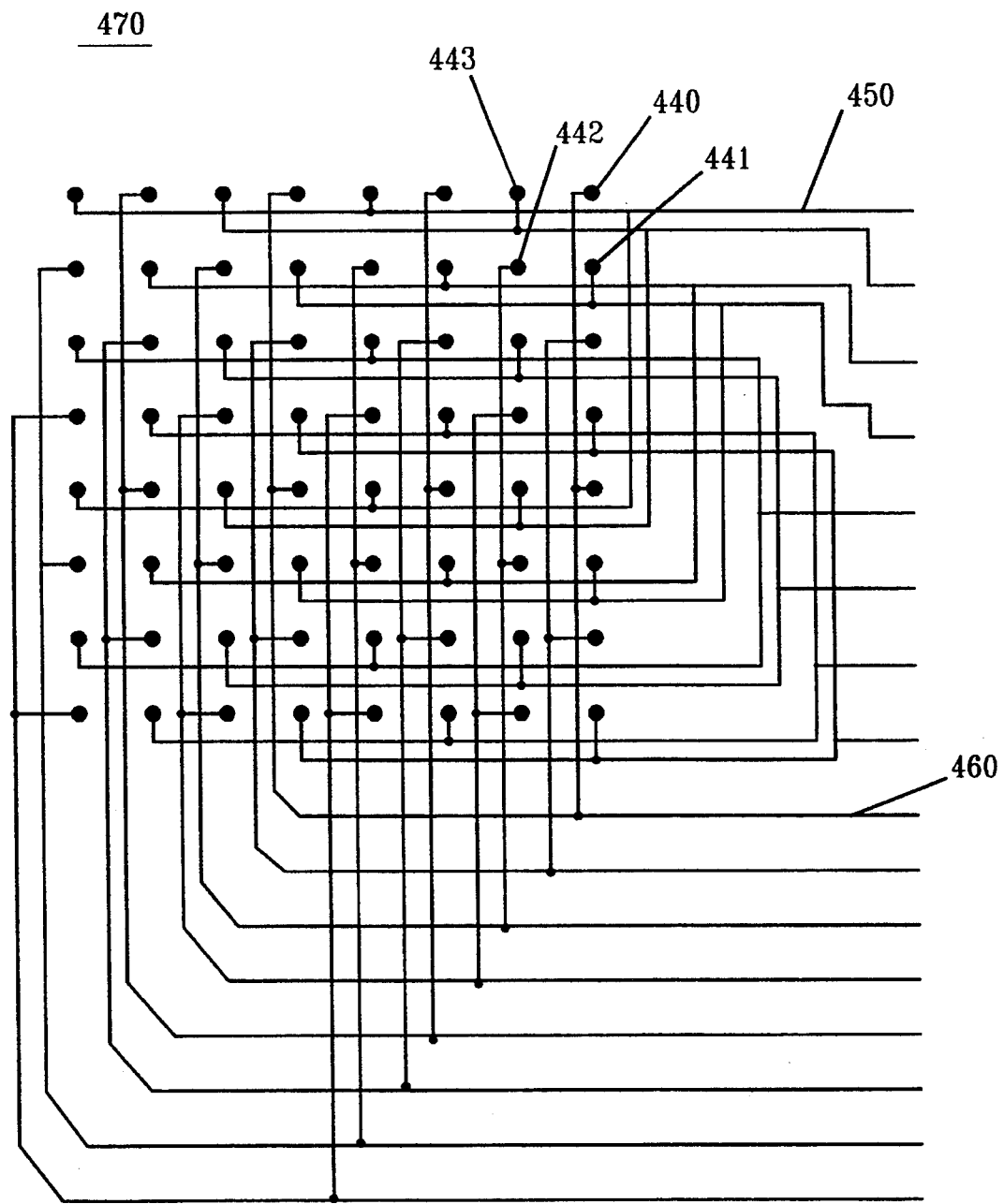
FIG. 9 shows an alternate interleaved row and column wiring within the anode array of a single anode region.

Any wiring pattern that conforms to these rules is acceptable, as further exemplified by FIG. 9. Thus for each anode region 470 there are a plurality of row leads 450 connected to a first half of the anodes 440, and a plurality of column leads 460 connected to a second half of the anodes 440.

The anodes 440 are spaced (2.54 millimeters apart in the preferred embodiment) such that any valid signal will trigger electrical signals on five anodes: the center anode, the two adjacent row anodes, and the two adjacent column anodes. The digital word created by these five electrical signals is compared to a look-up table of valid words in the processing circuitry 600. Numerous different look-up tables may be used, but preferably if just a single anode 440 triggers an electrical signal, the word created will not be found in the look-up table of valid words, and will not be used in creating the electronic representation of the subject 20. In this manner, the dark current pulse problem associated with traditional scintillation camera designs is overcome.

In addition, preferably, should any combination of five anodes 440 other than that described above trigger a word, or should some other invalid combination of anodes 440 trigger a word, the resultant word will again be found to be invalid when compared to the values in the look-up table, and again will not be used to assemble the electronic representation of the subject 20.

Referring again to FIG. 1, the multiplexer 500 is connected to all the row leads 450 and column leads 460 from the VLP detector 400. The multiplexer 500 joins the electrical signals received from the row leads 450 and the column leads 460 from a single anode region 470 into a single word. The word from each anode region 470 is processed in parallel with the words from all other anode regions 470 by the processing circuitry 600. Having independent processing circuitry 600 for each anode region 470 within a single PMT 410 greatly speeds the imaging rate of the scintillation camera 60. The electronic representation is finally received by the display 700, which converts it into an image 710.

In an alternate embodiment, both the HEP collimator 100, and the VLP collimator 300 are excluded, and the spatial resolution is maintained by calculations and look-up tables within the processing circuitry 600. Having thus described some preferred embodiments, it will be appreciated that the subject invention is capable of numerous rearrangements, modifications and substitution of parts without departing from the spirit of the invention.

What is claimed is:

1. A camera for imaging a subject using HEP's, comprising:
   (A) a HEP detector to convert the HEP's into VLP's;
   (B) a VLP detector having at least one PMT to convert the VLP's into electrical signals, having:
      (i) a photocathode to emit electrons when struck by a VLP;
      (ii) a plurality of dynodes disposed in multiple layers proximate to said photocathode, to emit more electrons when struck by the electrons;
      (iii) at least one anode region adjacent the layers of said dynodes where all the anode regions are within a single plane;
      (iv) a plurality of anodes disposed in a single array of rows and columns within each said anode region, to produce an electrical signal when struck by the electrons;
      (v) a plurality of row leads connected to a first half of the anodes, associated with the anode rows and connected to no more than every second anode in an anode row, to conduct the electrical signal;
      (vi) a plurality of column leads connected to a second half of the anodes, associated with the anode columns, connected to no more than every second anode in an anode column, and not connected to any anode connected to a row lead, to conduct the electrical signal;
   (C) processing circuitry to convert the electrical signals conducted by said row and column leads from said VLP detector into an electronic representation of the subject;
   (D) a display to convert the electronic representation of the subject from said processing circuitry into an image.

2. The device of claim 1 further comprising a HEP collimator disposed between the subject and said HEP detector, to pass only the HEP's received from the subject along directional vectors which do not deviate more than a predetermined value from a predetermined direction.

3. The device of claim 2 wherein said HEP collimator further comprises a sheet of material with two parallel surfaces disposed opposite each other, impervious to HEP's, with a plurality of vias between the two parallel surfaces, to pass only the HEP's which enter the vias along directional vectors which do not deviate more than a predetermined value from a predetermined direction.

4. The device of claim 1 further comprising a VLP collimator disposed between said HEP detector and said VLP detector, to pass only the VLP's received from said HEP detector along directional vectors which do not deviate more than a predetermined value from a predetermined direction.

5. The device of claim 4 wherein said VLP collimator further comprises light pipes with a first and second ends, the first end disposed adjacent said HEP detector and treated to a predetermined length, to pass only the VLP's which enter the light pipes through the first end along directional vectors which do not deviate more than a predetermined value from a predetermined direction.

6. The device of claim 5 wherein the treatment to said light pipes further comprises an opaque material that is applied to the outer surface of said light pipes.

7. The device of claim 6 wherein said light pipes have a square cross-section.

8. The device of claim 1 wherein said HEP detector further comprises a scintillator crystal.

9. The device of claim 8 wherein said scintillator crystal further comprises NaI(Tl).

10. The device of claim 8 wherein said scintillator crystal further comprises BGO.

11. The device of claim 1 wherein said HEP detector further comprises a plurality of scintillator crystals.

12. The device of claim 11 wherein said scintillator crystal further comprises NaI(Tl).

13. The device of claim 11 wherein said scintillator crystal further comprises BGO.

14. The device of claim 1 wherein said VLP detector further comprises said row and column leads within said anode regions that are addressable independently of said row and column leads of all other said anode regions.

15. The device of claim 14 further comprising a multiplexer to simultaneously receive and process all of the electrical signals conducted by all of said row and column leads from said VLP detector and pass the processed electrical signals to said processing circuitry.

16. A camera for imaging a subject using HEP's, comprising:
   (A) a HEP detector to convert the HEP's into VLP's;
   (B) a VLP detector having at least one PMT to convert the VLP's into electrical signals, having:
      (i) a photocathode to emit electrons when struck by a VLP;
      (ii) a plurality of dynodes disposed in multiple layers proximate to said photocathode, to emit more electrons when struck by the electrons;
      (iii) at least one anode region adjacent the layers of said dynodes;
      (iv) a plurality of anodes disposed in an array of rows and columns within each said anode region, to produce an electrical signal when struck by the electrons;
      (v) a plurality of row leads connected to a first half of the anodes, associated with the anode rows and connected to no more than every second anode in an anode row, to conduct the electrical signal;
      (vi) a plurality of column leads connected to a second half of the anodes, associated with the anode columns and connected to no more than every second anode in an anode column, to conduct the electrical signal;
   (C) processing circuitry to convert the electrical signals conducted by said row and column leads from said VLP detector into an electronic representation of the subject, wherein said processing circuitry further comprises a look-up table of valid combinations of electrical signals to compare to the electrical signals received from said VLP detector, the valid combinations of electrical signals used to assemble the electronic representation of the subject;
   (D) a display to convert the electronic representation of the subject from said processing circuitry into an image.

17. A camera for imaging a subject using HEP's, comprising:
   (A) a HEP collimator having a sheet of material with two parallel surfaces, impervious to HEP's, with a plurality of vias between the two parallel surfaces, to pass only the HEP's which enter the vias along directional vectors which do not deviate more than a predetermined value from a predetermined direction;

(B) a HEP detector having a plurality of BGO scintillator crystals to convert the HEP's into VLP's;

(C) a VLP collimator having light pipes having a square cross-section, with a first and second ends, the first end disposed adjacent said HEP detector and treated on the outer surface to a predetermined length with an opaque material, to pass only the VLP's received from said HEP detector along directional vectors which do not deviate more than a predetermined value from a predetermined direction;

(D) a VLP detector having at least one PMT to convert the VLP's into electrical signals having:
  (i) a photocathode to emit electrons when struck by a VLP;
  (ii) a plurality of dynodes disposed in multiple layers proximate to said photocathode, to emit electrons when struck by the electrons;
  (iii) a plurality of anode regions adjacent the layers of said dynodes;
  (iv) a plurality of anodes within each of said anode regions, disposed in an array of rows and columns, to produce an electrical signal when struck by the electrons;
  (v) a plurality of row leads connected to a first half of the anodes, one row lead associated with each anode row and connected to no more than every second anode in the anode row, to conduct the electrical signal, said row leads for each of the said anode regions addressable independently of the row leads of all other said anode regions;
  (vi) a plurality of column leads connected to a second half of the anodes, one column lead associated with each anode column and connected to no more than every second anode in the anode column, to conduct the electrical signal, said column leads for each of the said anode regions addressable independently of the column leads of all other said anode regions;

(E) a multiplexer to simultaneously receive and process all of the electrical signals conducted by all of said row and column leads from said VLP detector;

(F) processing circuitry having a look-up table of valid combinations of electrical signals to compare to the electrical signals received by said multiplexer, the valid combinations of electrical signals used to assemble an electronic representation of the subject;

(G) a display to convert the electronic representation of the subject from said processing circuitry into an image.

* * * * *